US006937966B1

(12) United States Patent
Hellerstein et al.

(10) Patent No.: US 6,937,966 B1
(45) Date of Patent: Aug. 30, 2005

(54) SYSTEM AND METHOD FOR ON-LINE ADAPTIVE PREDICTION USING DYNAMIC MANAGEMENT OF MULTIPLE SUB-MODELS

(75) Inventors: Joseph L. Hellerstein, Ossining, NY (US); Fan Zhang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 09/591,122

(22) Filed: Jun. 9, 2000

(51) Int. Cl.[7] .............................................. G06F 7/60
(52) U.S. Cl. .......................................... 703/2; 703/22
(58) Field of Search ........................... 703/22, 2, 6, 12; 700/29, 42, 170; 706/14, 12, 45; 702/50; 381/71.8; 763/2; 707/10, 101; 375/240; 709/224

(56) References Cited

U.S. PATENT DOCUMENTS

| | | | | |
|---|---|---|---|---|
| 5,251,262 A | * | 10/1993 | Suzuki et al. | 381/71.8 |
| 5,793,429 A | * | 8/1998 | Kim et al. | 375/240.19 |
| 5,798,949 A | * | 8/1998 | Kaub | 703/6 |
| 5,862,507 A | | 1/1999 | Wu et al. | |
| 6,230,062 B1 | * | 5/2001 | Shah | 700/29 |
| 6,338,066 B1 | * | 1/2002 | Martin et al. | 707/10 |
| 6,430,615 B1 | * | 8/2002 | Hellerstein et al. | 709/224 |
| 6,474,153 B1 | * | 11/2002 | Yamanaka et al. | 73/170.17 |
| 6,513,025 B1 | * | 1/2003 | Rosen | 706/45 |
| 6,529,887 B1 | * | 3/2003 | Doya et al. | 706/12 |
| 6,542,894 B1 | * | 4/2003 | Lee et al. | 707/101 |
| 6,546,379 B1 | * | 4/2003 | Hong et al. | 706/14 |
| 6,826,521 B1 | * | 11/2004 | Hess et al. | 703/12 |

OTHER PUBLICATIONS

Karimi et al., "Robust adaptive control of a flexible transmission system using multiple models", IEEE 1998.*

Basseville et al., "A unified framework for statistical change detction", IEEE 1991.*

Hellerstein et al., "Characterizing Normal operations of a Web server: Application to workload Forecasting and Problem Detection", Proceedings of the 1998 Conference of the computer measurement Group, Dec. 1998.*

Riis, "Combining Neural networks for protein Secondary structure prediction", IEEE 1995.*

J.L. Hellerstein et al., "An Approach to Predictive Detection for Service Level Management," Integrated Network Management VI, edited by M. Sloman et al., IEEE Publishing, pp. 309-322, May 1999.

V. Kadirkamanathan et al., "A Stochastic Method for Neural-Adaptive Control of Multi-Modal Nonlinear Systems," UKACC International Conference on Control, pp. 49-53, Sep. 1998.

R. Rao, "Dynamic Appearance-Based Recognition," IEEE Computer Society Conference on Computer Vision and Pattern Recognition, pp. 540-546, Jun. 1997.

(Continued)

Primary Examiner—Kevin J. Teska
Assistant Examiner—Kandasamy Thangavelu
(74) Attorney, Agent, or Firm—Rafael Perez-Pineiro; Ryan, Mason & Lewis, LLP

(57) ABSTRACT

Predictive models are widely used for tasks in many domains. The present invention addresses the problem of prediction of non-stationary processes by dynamically managing multiple models. The system comprises a model assessor, a model adapter, a plurality of sub-models, a plurality of model combiner functions, training data that is used to estimate model parameters, and test data that is used to test for change points. Two processes are described, one for handling data updates and another that addresses prediction requests.

18 Claims, 5 Drawing Sheets

OTHER PUBLICATIONS

P. Eide et al., "An MMAE Failure Detection System for the F-16," IEEE Transactions on Aerospace and Electronic Systems, vol. 32, No. 3, pp. 1125-1136, Jul. 1996.

M. Basseville et al., "Detection of Abrupt Changes: Theory and Application," Prentice Hall, pp. 29-42, 1993.

* cited by examiner

SYSTEM AND METHOD FOR ON-LINE ADAPTIVE PREDICTION USING DYNAMIC MANAGEMENT OF MULTIPLE SUB-MODELS

FIELD OF THE INVENTION

The present invention relates generally to performance management and, more particularly, to automated performance management techniques which provide on-line adaptive predictions using dynamic management of multiple sub-models.

BACKGROUND OF THE INVENTION

Predictive models are widely used for tasks in many domains. Examples include: anticipating future customer demands in retailing by extrapolating historical trends; planning equipment acquisition in manufacturing by predicting the outputs that can be achieved by production lines once the desired machines are incorporated; and diagnosing computer performance problems by using queuing models to reverse engineer the relationships between response times and service times and/or arrival rates.

Predictive models can take many forms. Linear forecasting models, such as Box-Jenkins models, are widely used to extrapolate trends. Weather forecasting often uses systems of differential equations. Analysis of computer and manufacturing systems frequently use queuing models.

Predictive models are of two types. Off-line models estimate their parameters from historical data. This is effective for processes that are well understood (e.g., industrial control) but is much less effective for processes that change rapidly (e.g., web traffic). On-line models adjust their parameters with changes in the data and so are able to adapt to changes in the process. For this reason, a focus of the present invention is on-line models.

Another consideration is the exploitation of multiple models. For example, in computer systems, forecasting models are used to anticipate future workloads, and queuing models are employed to assess the performance of equipment at the future workload levels. Indeed, over time, it is often necessary to use many models in combination.

To illustrate this point, we consider a forecasting model for web server traffic. Consider the model described in J. Hellerstein, F. Zhang, and P. Shahabuddin, "An Approach to Predictive Detection for Service Level Management," Integrated Network Management VI, edited by M. Sloman et al., IEEE Publishing, May 1999, the disclosure of which is incorporated by reference herein, that forecasts the number of hypertext operations per second at time t, which we denote by S(t). The following models are considered:

1. S(t) is determined entirely by its mean. That is, S(t) =mean+e(t), where e(t) is the model's "residual," i.e., what is left after the effect of the model is removed.
2. S(t) is determined by its mean and time of day. That is, t=(i,l), where i is an interval during a 24 hour day and l specifies the day. For example, days might be segmented into five minute intervals, in which case i ranges from 1 to 288. Thus, S(i,l)=mean+mean_tod(i)+e(i,l).
3. S(t) is determined by its mean, time of day and day of week. That is, t=(i,j,l), where i is an interval during a 24 hour day, j indicates the day of week (e.g., Monday, Tuesday), and l specifies the week instance. Thus, S(i,j, l)=mean+mean_tod(i)+mean_month(k)+e(i,j,l).
4. S(t) is determined by its mean, time of day, day of week and month. Here, t=(i,j,k,l), where k specifies the month and l specifies the week instance within a month. Thus, S(i,j,k,l)=mean+mean_tod(i)+mean_day-of-week(j) +mean_month(k)+e(i,j,k,l).

It turns out that the S(i,j,k,l) model provides the best accuracy. So, this begs the question: Why not use this model and ignore the others? The answer lies in the fact that the data is non-stationary. Using the techniques employed in the above-referenced Hellerstein, Zhang, and Shahabuddin article, obtaining estimates of tod(i) requires at least one measurement of the $i^{th}$ time of day value. Similarly, at least one week of data is required to estimate mean_day-of-week (j) and several months of data are required to estimate mean_month(k).

Under these circumstances, a reasonable approach is to use different models depending on the data available. For example, we could use model (1.) above when less than a day of history is present; model (2.) when more than a day and less than a week is present, and so on.

Actually, the requirements are a bit more complex still. A further issue arises in that we need to detect when the characteristics of the data have changed so that a new model is needed. This is referred to as change-point detection, see, e.g., Basseville and Nikiforov, "Detection of Abrupt Changes" Prentice Hall, 1993, the disclosure of which is incorporated by reference herein. Change point detection tests for identically distributed observations (i.e., stationarity) under the assumption of independence. However, it turns out that the residuals of the above model are not independent (although they are identically distributed under the assumption of stationarity and the model being correct). Thus, still another layer of modeling is required. In the above-referenced Hellerstein, Zhang, and Shahabuddin article, a second order autoregressive model is used. That is, e(t)=a1*e(t−1)+a2*e(t−2)+y(t), where a1 and a2 are constants estimated from the data.

So the question arises: What happens after a change-point is detected? There are two possibilities. The first is to continue using the old model even though it is known not to accurately reflect the process. A second approach is to re-estimate process parameters. That is, data that had been used previously to estimate parameter values must be flushed and new data must be collected. During this period, no prediction is possible. In general, some prediction is required during this transition period. Thus, it may be that a default model is used until sufficient data is collected.

The foregoing motivates the requirements that the present invention envisions for providing adaptive prediction. First, it must be possible to add new modeling components (e.g., include time-of-day in addition to the process mean) when sufficient data is available to estimate these components and it is determined that by adding the components there is an improvement in modeling accuracy. Second, we must be able to remove modeling components selectively as non-stationarities are discovered. For example, it may be that the day-of-week effect changes in a way that does not impact time-of-day. Thus, we need to re-estimate the mean_day-of-week(j) but we can continue using the mean_tod(i).

Existing art includes: the use of multiple models, e.g., U.S. Pat. No. 5,862,507 issued to Wu et al.; multiple models, e.g., P Eide and P Maybeck, "MMAE Failure Detection System for the F-16," IEEE Transactions on Aerospace Electronic Systems, vol. 32, no. 3, 1996; adaptive models, e.g., V. Kadirkamanathan and S. G. Fabri, "Stochastic Method for Neural-adaptive Control of Multi-modal Non-lineary Systems," Conference on Control, p. 49–53, 1998; and the use of multiple modules that adaptively select data, e.g., Rajesh Rao, "Dynamic Appearance-based Recognition," IEEE Computer Society Conference on Computer Vision, p. 540–546, 1997, the disclosures of which are incorporated by reference herein. However, none of these address the issue of "dynamic management of multiple on-line models" in that this art does not consider either: (a) when to exclude a model; or (b) when to include a model.

There is a further consideration as well. This relates to the manner in which measurement data is managed. On-line models must (in some way) separate measurement data into "training data" and "test data." Training data provides a means to estimate model parameters, such as mean, mean_tod(i), mean_day-of-week(j), mean_month(k). Test data provide a means to check for change points. In the existing art, a single repository (often in-memory) is used to accumulate data for all sub-models. Data in this repository is partitioned into training and test data. Once sufficient data has been accumulated to estimate parameter values for all sub-models and sufficient training data is present to test for independent and identically distributed residuals, then the validity of the complete model is checked. A central observation is that a dynamic management of multiple models requires having separate training data for each model. Without this structure, it is very difficult to selectively include and exclude individual models. However, this structure is not present in the existing art.

SUMMARY OF THE INVENTION

The present invention addresses the problem of prediction of non-stationary processes by dynamically managing multiple models. Herein, we refer to the constituent models as "sub-models." We use the term "model" to refer to the end-result of combining sub-models. It is to be appreciated that, once there is an accurate model, predictions are obtained from models in a straightforward way, e.g., as in least squares regression, time series analysis, and queuing models.

Dynamic management of sub-models according to the invention provides an ability to: (i) combine the results of sub-models; (ii) determine change points; that is, when the model is no longer a faithful characterization of the process; (iii) identify the sub-model(s) to exclude when a change point occurs and/or as more data is acquired; (iv) identify the sub-model (s) to include when a change point occurs and/or as more data is acquired; and (v) manage training and test data in a way to accomplish the above objectives.

In one aspect of the present invention, an on-line adaptive prediction system employing dynamic management of multiple sub-models may comprise the following components in order to address the foregoing objectives. A sub-model combiner component combines the results of sub-models. This is in part based on information in the model context that includes combining functions that specify how the results of sub-models should be combined. A model assessor component computes residuals of the model and checks for change points. A model adapter component determines the sub-models to include and/or exclude, updating the model context as needed. Training data is maintained separately by each sub-model to enable the dynamic inclusion and exclusion of sub-models. Test data is managed by the model assessor component.

The present invention provides two central processes. The first details the steps taken when new measurement data is made available to the prediction system. In one aspect of the invention, the process includes steps for: (a) updating test data; (b) updating training data of each sub-model and its estimates of parameters; (c) testing for change points; and (d) determining the best combination of sub-models based on the results of change point detection and other factors. The second process details the actions performed when an application requests a prediction. In one aspect of the invention, this process includes the steps of: (a) determining the input parameters for each sub-model; (b) requesting predictions from each sub-model; and (c) combining the results.

The present invention provides numerous benefits to developers of systems that require a predictive capability for non-stationary processes. First, accuracy can be improved by choosing the best combination of sub-models. The invention supports this by having a flexible technique for sub-model inclusion and exclusion, as well as a means to test for change points.

Second, the present invention provides methodologies to adjust incrementally the model as more data is available for parameter estimation. Accurate models often require considerable data to estimate parameters. However, less accurate models are possible if the data available is modest. If the process being modeled is non-stationary, then the data available for parameter estimation will vary greatly. Specifically, if change points are frequent, then little training data is acquired before the next change point, which must discard this data so that parameters can be estimated for the new regime of the process. On the other hand, if change points are infrequent, considerable data can be acquired and hence it is possible to include sub-models that require more data to estimate their parameters. As such, there is considerable benefit to a technique that adapts the sub-models used based on the data available.

Third, the modular structure provided by the present invention greatly facilitates the incremental inclusion and exclusion of sub-models, as well as the manner in which they are combined. Thus, it is much easier to update the model than would be the case in a technique that hard codes sub-models and their relationships.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative on-line environment and predictive model application arrangement. However, it is to be understood that the present invention is not limited to such a particular arrangement. Rather, the invention is more generally applicable to any on-line environment and predictive model application arrangement in which it is desirable to: (i) improve the accuracy of the predictive models by adjusting one or more predictive models as more data is available for model parameter estimation by inclusion and/or exclusion of sub-models in the one or more predictive models; and/or (ii) improve the accuracy of the predictive models by improving the handling of prediction requests.

Figure 1:
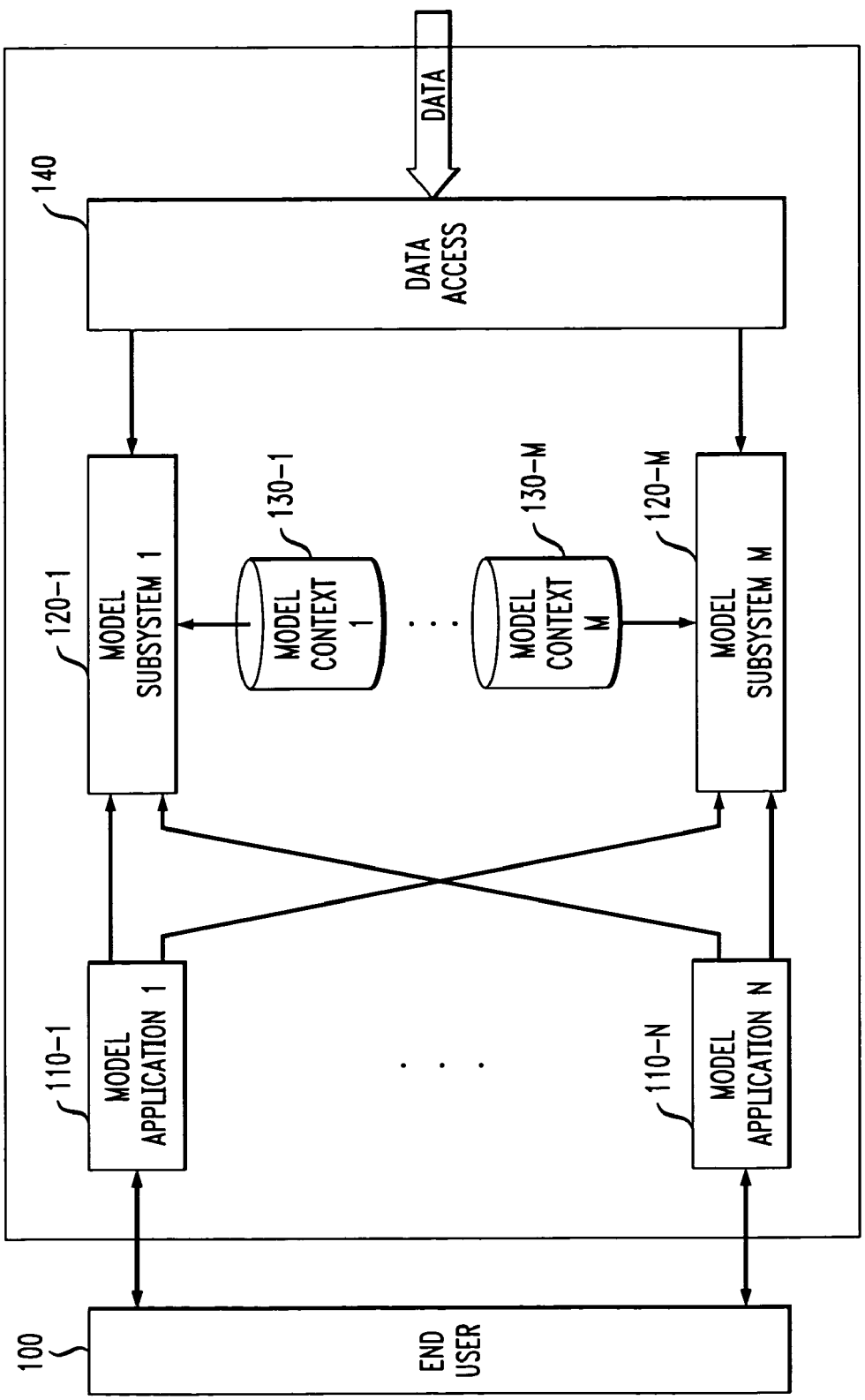
FIG. 1 is a block diagram illustrating an overall architecture of an environment in which an on-line adaptive prediction system employing dynamic management of multiple sub-models according to one embodiment of the present invention may operate.

Referring now to FIG. 1, a block diagram is shown illustrating an overall architecture of an environment in which an on-line adaptive prediction system employing dynamic management of multiple sub-models according to one embodiment of the present invention may operate. As shown, an end user 100 interacts with applications 110-1 through 110-N that exploit predictive models that, in turn, use one or more model subsystems 120-1 through 120-M. The subsystems 120-1 through 120-M comprise the on-line adaptive prediction system employing dynamic management of multiple sub-models.

It is to be understood that model applications may be computer programs which perform some function based on the domain in which they are employed, e.g., anticipating future customer demands in retailing by extrapolating historical trends; planning equipment acquisition in manufacturing by predicting the outputs that can be achieved by production lines once the desired machines are incorporated; and diagnosing computer performance problems by using queuing models to reverse engineer the relationships between response times and service times and/or arrival rates.

It is to be further understood that the end-user may include a computer system that is in communication with the one or more computer systems on which the model applications and model subsystems are running. The end-user system may be remote from these other computer systems, or co-located with one or more of them. The computer systems may be connected by any suitable network.

As will be explained in detail below, the model subsystems make use of model contexts repositories 130-1 through 130-M. Each model context repository contains information such as the way in which sub-models are combined and the current choice of sub-models. Model subsystems 120-1 through 120-M are informed of data updates by the data access component 140. The data being provided to the data access component is coming from the process or system that the model application is interfacing with, e.g., the retailer, the production line, the computer network whose performance is being considered, etc. It is to be appreciated that while more than one model application and more than one model subsystem is shown in FIG. 1, the system may operate with one or more model applications and model subsystems.

Figure 2:
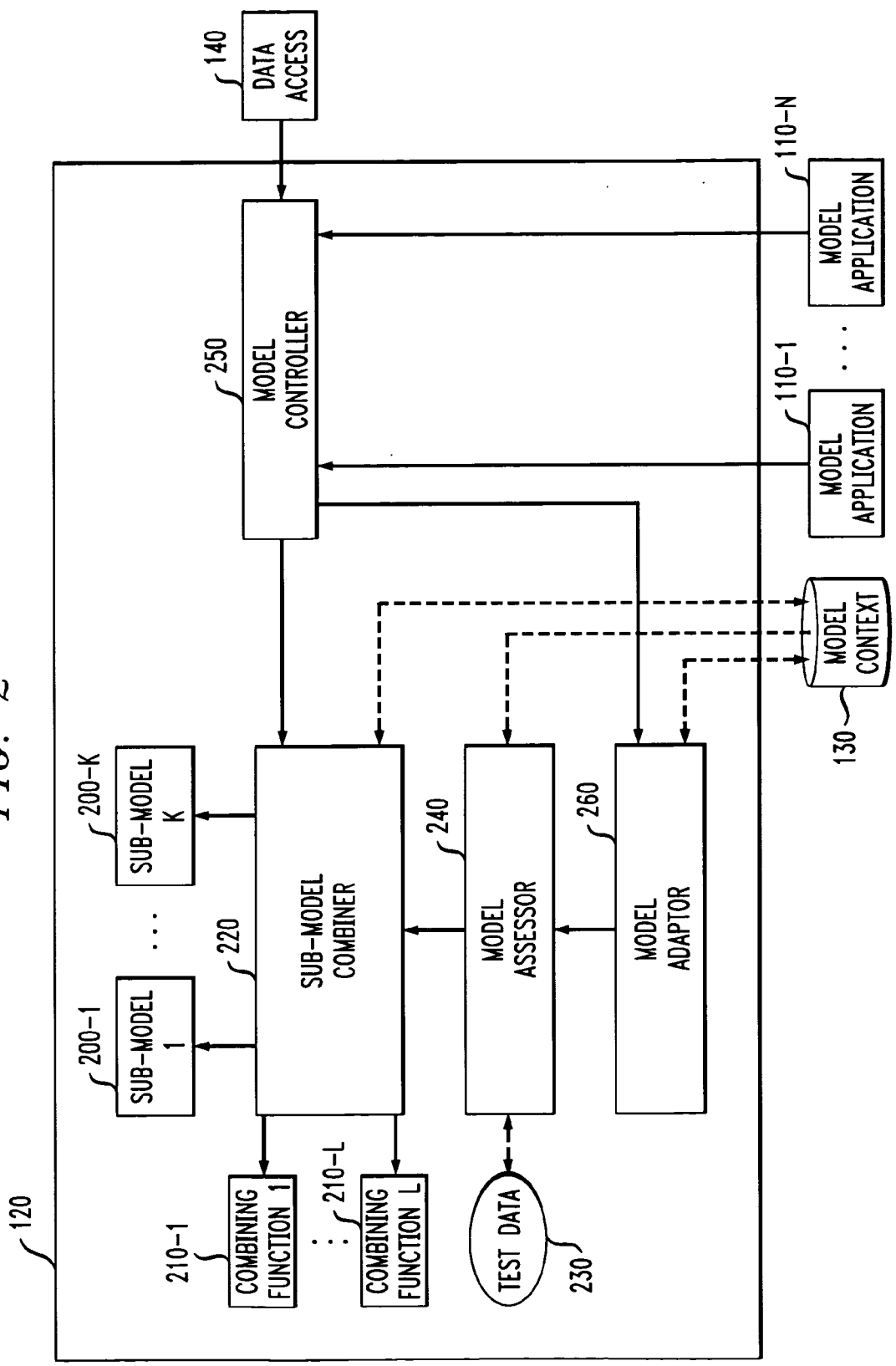
FIG. 2 is a block diagram illustrating an on-line adaptive prediction system employing dynamic management of multiple sub-models according to one embodiment of the present invention.

Referring now to FIG. 2, a block diagram is shown illustrating an on-line adaptive prediction system employing dynamic management of multiple sub-models according to one embodiment of the present invention. Particularly, FIG. 2 depicts an embodiment of one of the model subsystems (120-1 through 120-M) of FIG. 1. The model subsystem comprises sub-models 200-1 through 200-K, combining functions 210-1 through 210-L, a sub-model combiner 220, test data 230, model assessor 240, a model controller 250 and a model adaptor 260.

As shown in FIG. 2, both the data access component (140 in FIG. 1) and model applications (110-1 through 110-N in FIG. 1) make their requests to the model controller 250, which controls the overall flow within the model subsystem. The model adapter 260 determines if a new combination of sub-models should be used by consulting the model assessor 240. The latter computes the residuals of the model for test data 230 and maintains test data. The sub-model combiner 220 is responsible for computing predictions by invoking each sub-model (200-1 through 200-K) and combining the results by consulting the model context and using the appropriate combining functions (210-1 through 210-L). Doing so requires determining the parameters for each sub-model. In addition, the sub-model combiner determines the data to be provided to sub-models when a data update occurs. The combining functions take as input the results of one or more sub-models and compute partial results. The sub-models accept two kinds of requests: (i) data update requests; and (ii) prediction requests.

Figure 3:
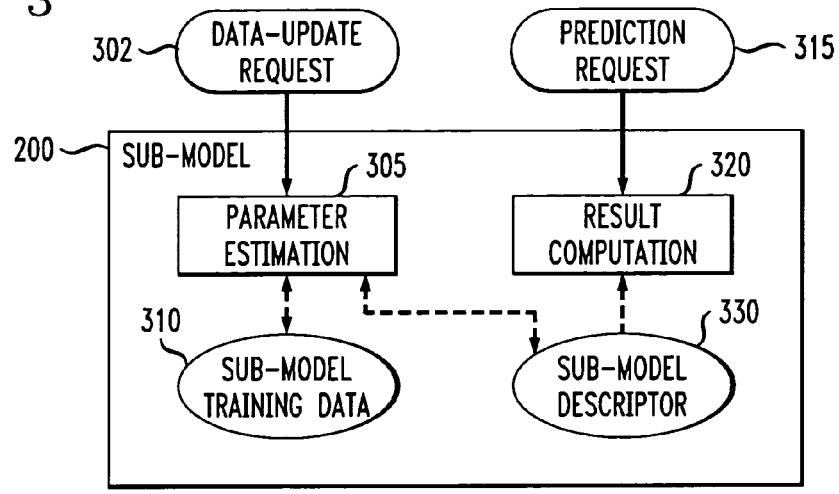
FIG. 3 is a block diagram illustrating a sub-model component according to one embodiment of the present invention.

Referring now to FIG. 3, a block diagram is shown illustrating a sub-model component according to one embodiment of the present invention. Specifically, FIG. 3 illustrates components of a sub-model such as sub-models 200-1 through 200-K in FIG. 2. As shown, the sub-model comprises a parameter estimation component 305, sub-model training data 310, a result computation component 320 and a sub-model descriptor 330.

In operation, data update requests 302 are made to the parameter estimation component 305, which interacts with the sub-model training data 310 and the sub-model descriptor 330. The former contains the data needed to estimate the parameters of the model. The latter specifies the data required to perform these estimates and contains the values of the parameter estimates. Prediction requests 315 are made to the result computation component 320, which reads the parameter values and the specifics of the computation to perform from the sub-model descriptor 330.

Figure 4:
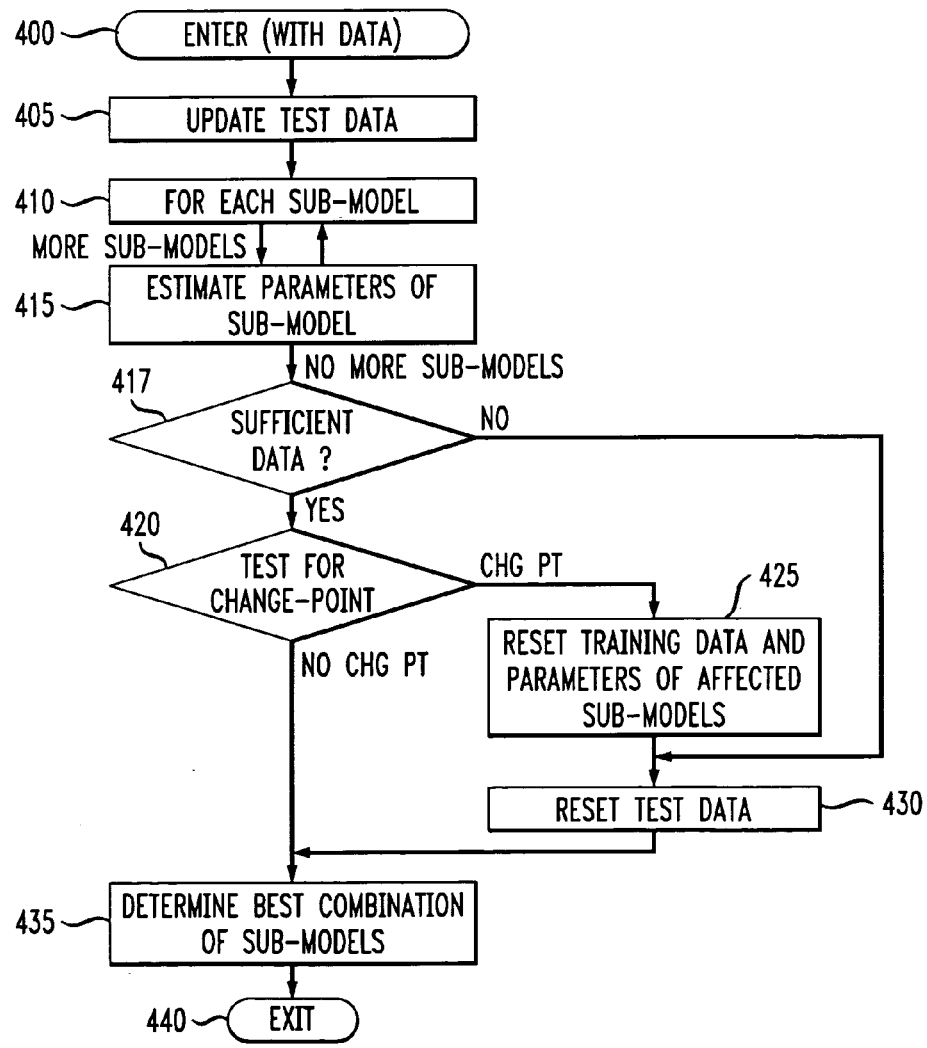
FIG. 4 is a flow diagram illustrating a process for handling data updates in an on-line adaptive prediction system employing dynamic management of multiple sub-models according to one embodiment of the present invention.

Referring now to FIG. 4, a flow diagram is shown illustrating a process for handling data updates in an on-line adaptive prediction system employing dynamic management of multiple sub-models according to one embodiment of the present invention. Reference will therefore be made back to components of FIGS. 2 and 3. The process begins in at step 400 where the request enters with data. In step 405, the test data is updated. In step 410, an iteration is done for a sub-model in which step 415 invokes the sub-model to estimate the model parameters for the data presented. In step 417, a check is done to see if sufficient data is present to do change-point detection for the current model. If not, step 430 resets the test data. Otherwise, step 420 tests for a change-point. If a change-point is present, training data and parameters are reset for each sub-model by invoking it with null data. In step 435, the best combination of sub-models is determined. Sub-models can be evaluated in standard ways, such as minimizing residual variance or maximizing the variability explained. The process terminates at block 440. It is to be understood that test data is data used to evaluate a sub-model. This is separate from the data used to estimate parameters of a sub-model.

With reference back to FIGS. 2 and 3, it is to be appreciated that step 405 is accomplished by the combination of the model controller 250, the model adaptor 260, and the model assessor 240; step 410 by the sub-model combiner 220; step 415 by the parameter estimation component 305; steps 417 and 420 by the model assessor 240; step 435 by the model adaptor 260; and steps 425 and 430 by the sub-model combiner 220 in combination with each sub-model 200.

Figure 5:
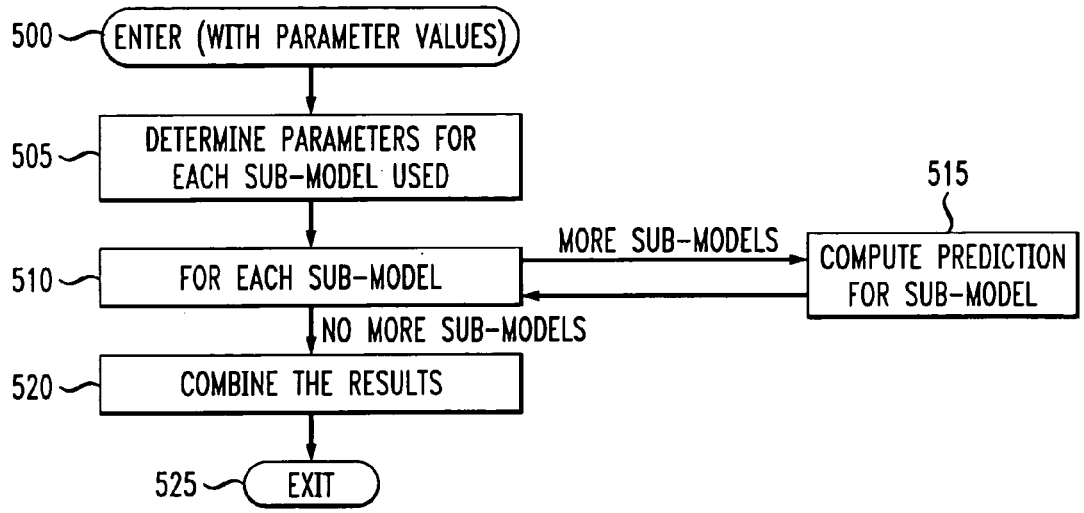
FIG. 5 is a flow diagram illustrating a process for handling prediction requests in an on-line adaptive prediction system employing dynamic management of multiple sub-models according to one embodiment of the present invention.

Referring now to FIG. 5, a flow diagram is shown illustrating a process for handling prediction requests in an on-line adaptive prediction system employing dynamic management of multiple sub-models according to one embodiment of the present invention. Reference will therefore be made back to components of FIGS. 2 and 3. In step 500, the process begins with entering the parameters to use in the prediction. The parameters for each sub-model used are determined in step 505. Step 510 iterates across each sub-model in the model. In step 515, the prediction is computed for each sub-model. Step 520 combines the results. The decision as to which sub-model to use is determined by the sub-model combiner 220 in combination with the model context 130. The latter is updated by the model adaptor 260 when it determines the best combination of sub-models to use (step 435 in FIG. 4). The process terminates in block 525.

Thus, with reference back to FIGS. 2 and 3, it is to be appreciated that steps 505, 510 and 520 are accomplished by the sub-model combiner 220, while step 515 is done by each sub-model 200.

Figure 6:
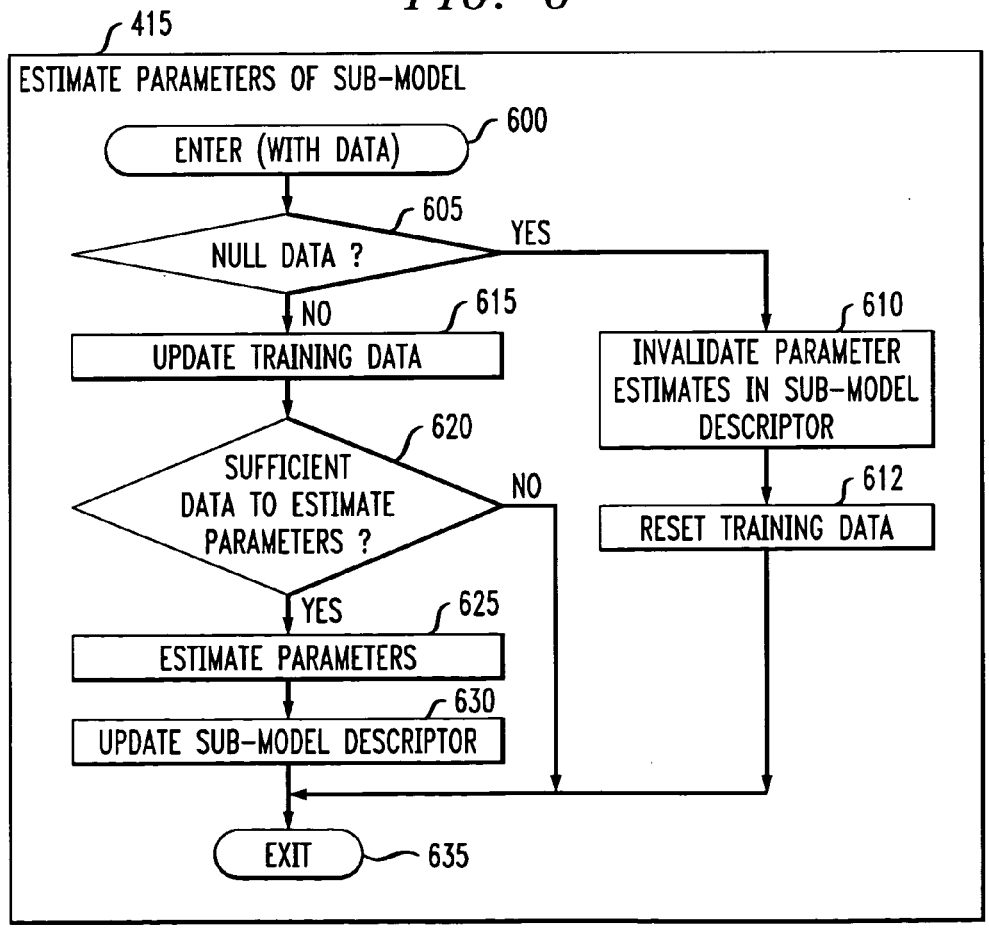
FIG. 6 is a flow diagram illustrating a process for estimating parameters in a sub-model component according to one embodiment of the present invention.

Referring now to FIG. 6, a flow diagram is shown illustrating a process for estimating parameters in a sub-model component according to one embodiment of the present invention. Specifically, FIG. 6 depicts details of the estimate parameter operation (step 415 in FIG. 4 and the parameter estimation component 305 in FIG. 3) as performed with respect to a sub-model. The process begins at step 600 when a sub-model is invoked to estimate parameters. Step 605 tests if the data provided on input is null. If so, step 610 invalidates or resets the parameter estimates in the sub-model descriptor (330 in FIG. 3), and step 612 resets the training data (310 in FIG. 3) in the sub-model. The process then terminates at block 635. If the data provided on input is not null, step 615 updates the training data. Step 620 tests if sufficient data is present to estimate the parameters of the model. If not, the process terminates at block 635. Otherwise, step 625 estimates the parameters, and step 630 updates the sub-model descriptor with the parameters values.

Figure 7:
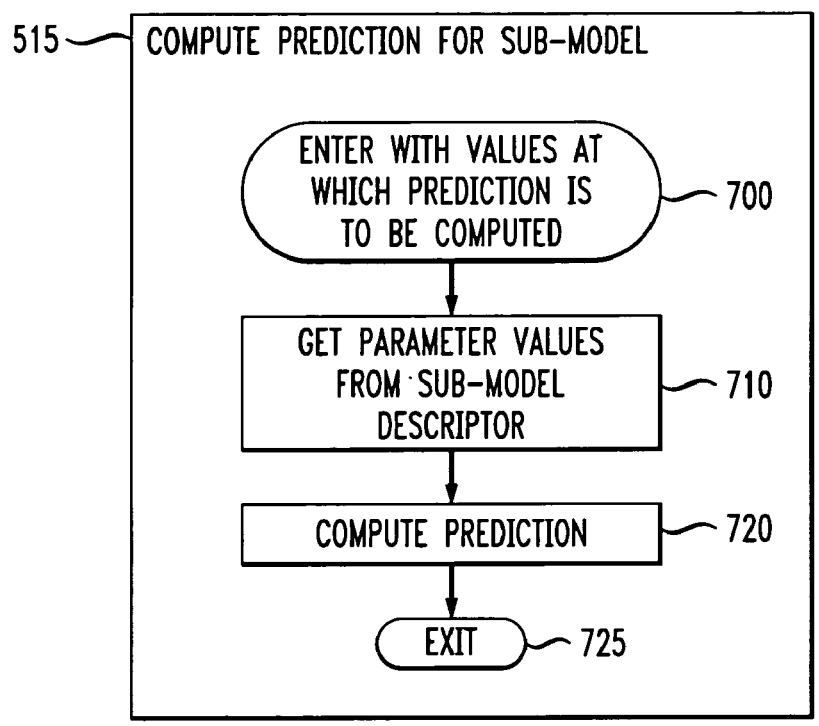
FIG. 7 is a flow diagram illustrating a process for computing predictions in a sub-model component according to one embodiment of the present invention.

Referring now to FIG. 7, a flow diagram is shown illustrating a process for computing predictions in a sub-model component according to one embodiment of the present invention. Specifically, FIG. 7 depicts details of the prediction computation operation (step 515 in FIG. 5 and the result computation component 325 in FIG. 3) as performed with respect to a sub-model. In step 700, the process is entered with the values of the inputs in the prediction request. Step 710 retrieves the values of the model parameters from the sub-model descriptor. Step 720 computes the prediction. At block 725, the process terminates.

Figure 8:
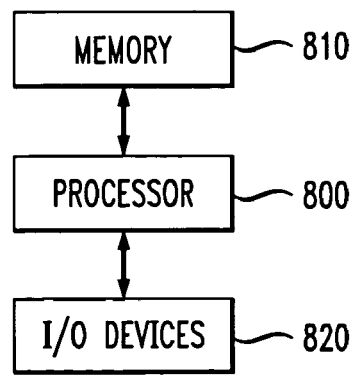
FIG. 8 is a block diagram illustrating a generalized hardware architecture of a computer system suitable for implementing an on-line adaptive prediction system employing dynamic management of multiple sub-models according to the present invention.

Referring now to FIG. 8, a block diagram is shown illustrating a generalized hardware architecture of a computer system suitable for implementing the various functional components/modules of an on-line adaptive prediction system employing dynamic management of multiple sub-models as depicted in the figures and explained in detail herein. It is to be understood that the individual components of the on-line adaptive prediction system, namely, the model subsystems 120-1 through 120-M (FIG. 1), and their components (FIGS. 2 and 3), may be implemented on one such computer system, or on more than one separate such computer systems. The other components shown in FIG. 1, e.g., end-user, model applications, model contexts and data access, may also be implemented on the same or other such computer systems. Also, individual components of the sub-systems and repositories may be implemented on separate such computer systems.

As shown, the computer system may be implemented in accordance with a processor 800, a memory 810 and I/O devices 820. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. Apparatus for providing on-line adaptive predictions for use by one or more applications used in association with one or more operations for which predictions may be requested, the predictions being performed in accordance with at least one model which includes one or more sub-models, the apparatus comprising:

at least one processor operative to at least one of: (i) determine an optimum combination of sub-models from the one or more sub-models to be used in computing on-line predictions, wherein the determination comprises at least one of including and excluding at least one of the one or more sub-models, the determination being made when a change point is detected in data associated with the one or more operations for which predictions may be requested and (ii) compute one or more predictions, in response to one or more requests from the one or more applications, using the one or more sub-models determined to provide an optimum prediction combination.

2. The apparatus of claim 1, wherein the adapting operation further comprises estimating one or more parameters associated with each of the one or more sub-models based on data received with respect to the detected change.

3. The apparatus of claim 2, wherein the one or more estimated parameters for a sub-model are used to update a descriptor associated with the sub-model.

4. The apparatus of claim 2, wherein the adapting operation further comprises testing for a change-point condition.

5. The apparatus of claim 1, wherein a sub-model maintains data used to estimate one or more parameters associated therewith.

6. The apparatus of claim 1, wherein a sub-model at least one of computes and stores one or more values associated with one or more sub-model parameters.

7. The apparatus of claim 1, wherein the prediction computing operation further comprises computing a prediction for each of the one or more sub-models determined to provide the optimum prediction combination.

8. The apparatus of claim 7, wherein the prediction computing operation further comprises combining the results of the one or more computed predictions.

9. A method of providing on-line adaptive predictions for use by one or more applications used in association with one or more operations for which predictions may be requested, the predictions being performed in accordance with at least one model which includes one or more sub-models, the method comprising at least one of the steps of:
  determining an optimum combination of sub-models from the one or more sub-models to be used in computing on-line predictions, wherein the determination comprises at least one of including and excluding at least one of the one or more sub-models, the determination being made when a change point is detected in data associated with the one or more operations for which predictions may be requested and
  computing one or more predictions, in response to one or more requests from the one or more applications, using the one or more sub-models determined to provide an optimum prediction combination.

10. The method of claim 9, wherein the adapting step further comprises estimating one or more parameters associated with each of the one or more sub-models based on data received with respect to the detected change.

11. The method of claim 10, wherein the one or more estimated parameters for a sub-model are used to update a descriptor associated with the sub-model.

12. The method of claim 10, wherein the adapting step further comprises testing for a change-point condition.

13. The method of claim 9, wherein a sub-model maintains data used to estimate one or more parameters associated therewith.

14. The method of claim 9, wherein a sub-model at least one of computes and stores one or more values associated with one or more sub-model parameters.

15. The method of claim 9, wherein the prediction computing step further comprises computing a prediction for each of the one or more sub-models determined to provide the optimum prediction combination.

16. The method of claim 15, wherein the prediction computing step further comprises combining the results of the one or more computed predictions.

17. An article of manufacture for providing on-line adaptive predictions for use by one or more applications used in association with one or more operations for which predictions may be requested, the predictions being performed in accordance with at least one model which includes one or more sub-models, comprising a machine readable medium containing one or more programs which when executed implement at least one of the steps of:
  determining an optimum combination of sub-models from the one or more sub-models to be used in computing on-line predictions, wherein the determination comprises at least one of including and excluding at least one of the one or more sub-models, the determination being made when a change point is detected in data associated with the one or more operations for which predictions may be requested and
  computing one or more predictions, in response to one or more requests from the one or more applications, using the one or more sub-models determined to provide an optimum prediction combination.

18. The article of claim 17, wherein a sub-model maintains data used to estimate one or more parameters associated therewith.

* * * * *